J. A. COLE.
RECORDING APPARATUS.
APPLICATION FILED JUNE 9, 1917.
1,283,085.
Patented Oct. 29, 1918.
2 SHEETS—SHEET 1.
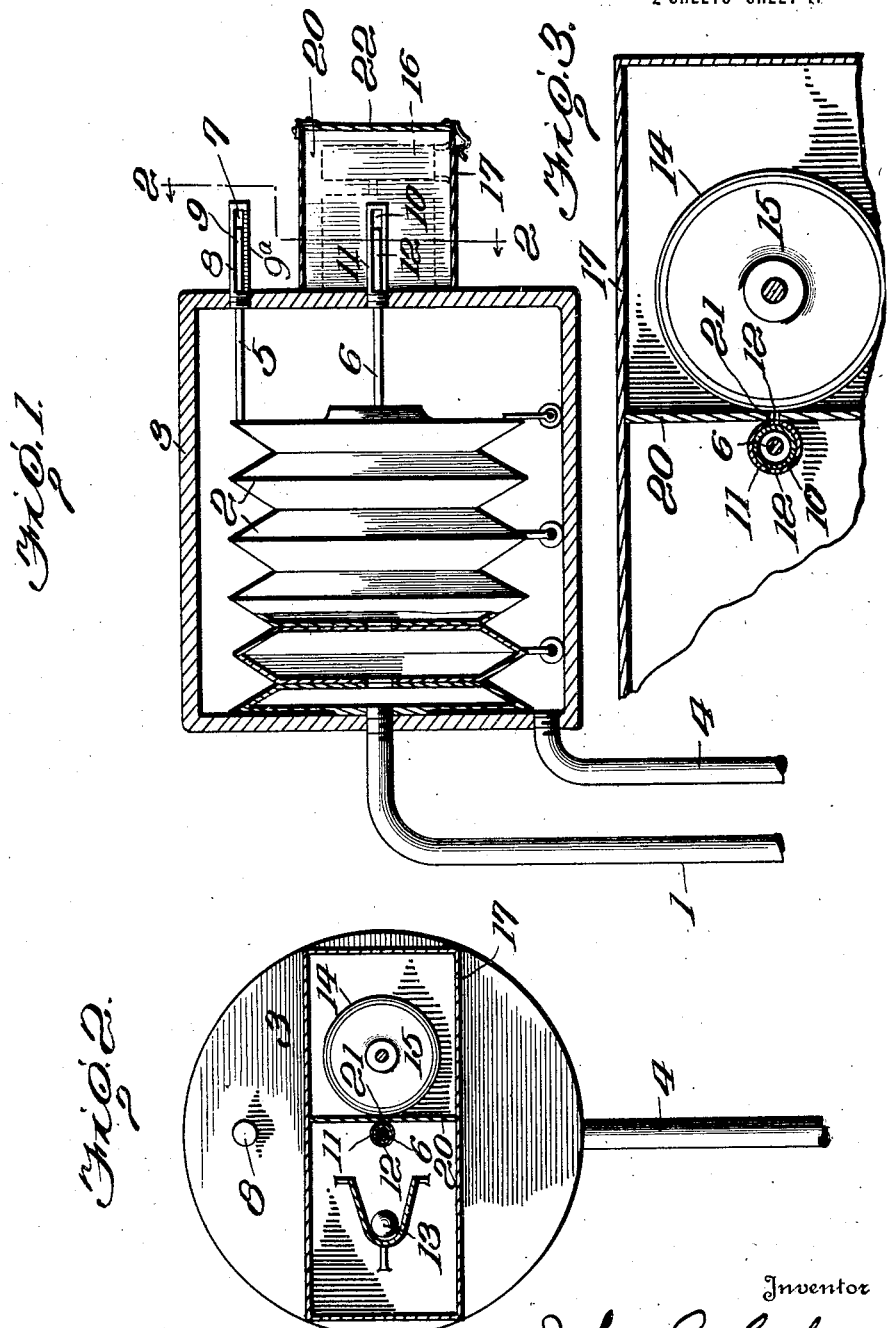
Inventor
John A. Cole
By Whitaker & Prevost
Attorneys J. A. COLE.
RECORDING APPARATUS.
APPLICATION FILED JUNE 9, 1917.
1,283,085.
Patented Oct. 29, 1918.
2 SHEETS—SHEET 2.
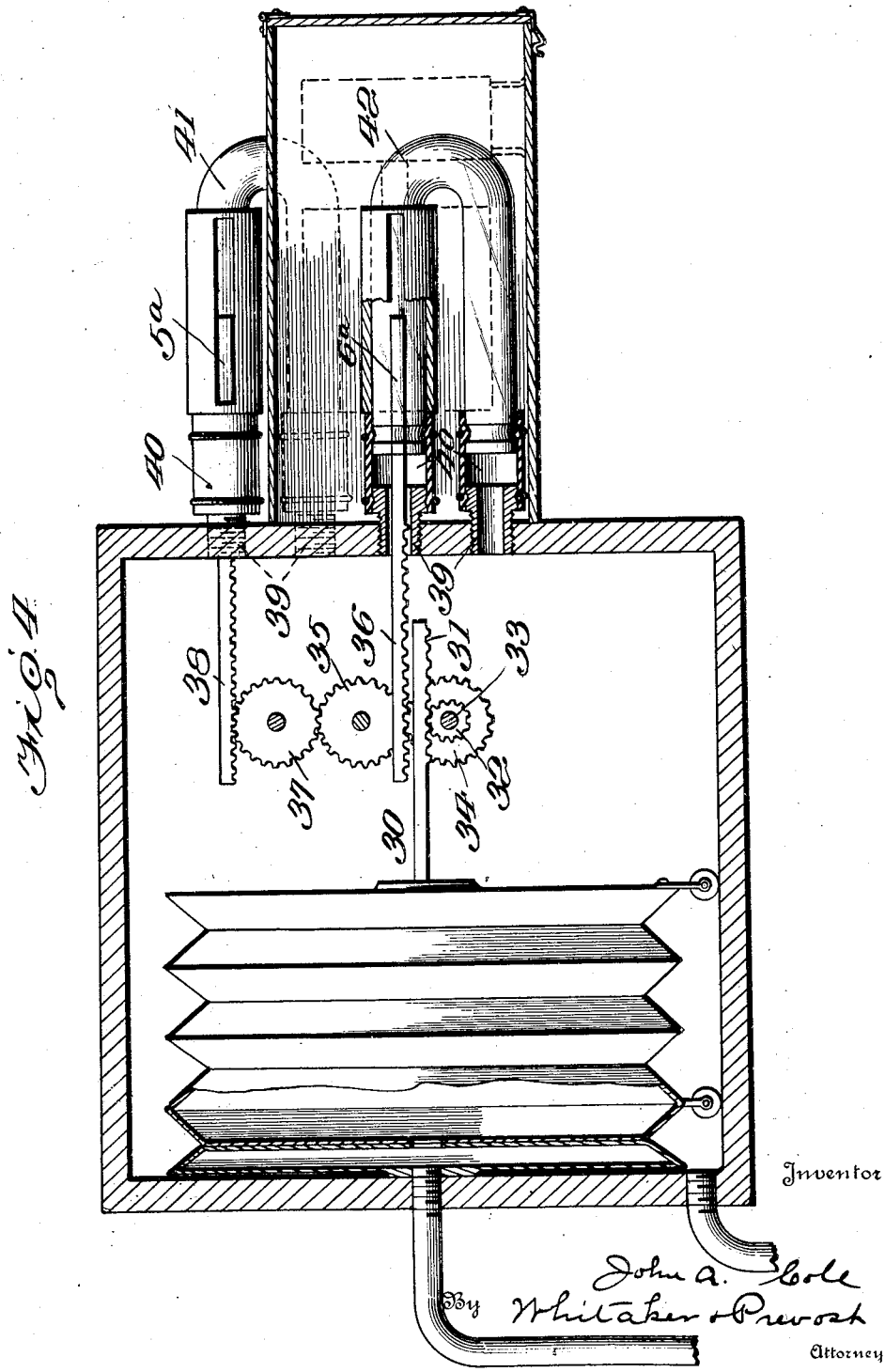

UNITED STATES PATENT OFFICE.

JOHN A. COLE, OF CHICAGO, ILLINOIS.

RECORDING APPARATUS.

1,283,085.  Specification of Letters Patent.  Patented Oct. 29, 1918.

Application filed June 9, 1917. Serial No. 173,744.

*To all whom it may concern:*

Be it known that I, JOHN A. COLE, a citizen of the United States, residing at Chicago, in the county of Cook and State of Illinois, have invented certain new and useful Improvements in Recording Apparatus; and I do hereby declare the following to be a full, clear, and exact description of the invention, such as will enable others skilled in the art to which it appertains to make and use the same.

My invention consists in the novel features hereinafter described, reference being had to the accompanying drawings, in which I have illustrated two forms or embodiments of my invention selected by me for purposes of illustration and the said invention is fully disclosed in the following description and claims.

Referring to the drawings:

Figure 1 is a vertical sectional view of my improved recording mechanism designed particularly for measuring the quantity of water flowing through a main or conduit and providing both a visible and permanent record.

Fig. 2 is a transverse sectional view taken on line 2—2 of Fig. 1.

Fig. 3 is a detail.

Fig. 4 is a sectional view of a modified form.

One of the objects of my invention is to provide a recording mechanism for use with a diaphragm recorder in which a post is secured to the free or movable end of the diaphragm and extends through the diaphragm housing into a transparent tube, so that the movements of the diaphragm will cause the post to move axially in the tube. If desirable these movements of the post in the tube may be photographed to provide a permanent record of the velocity of the flowing stream, which is being measured. I prefer to have the diaphragm move two posts, one of which will be visible for sight reading and the other of which will coöperate with photographing mechanism to provide a permanent photographic record of the movements of the diaphragm.

A further object of my invention is to provide mechanism which will multiply the movements of the diaphragm, whereby say an inch movement of the diaphragm will cause the post or posts to move two inches or more. This will increase the accuracy of the instrument, as slight movements of the diaphragm will be increased so in the posts as to be readily seen or photographed.

A still further object is to so mount the posts in the casing, as to permit movement of the same with the least possible friction and this I accomplish by mounting each of the posts in one leg of a U-tube, both legs of the U-tubes being connected with the casing, so that the water in the casing will flow through the tubes and have a tendency to keep the same clear of dirt or the like.

In the embodiment of my invention illustrated in Figs. 1 to 3 inclusive, 1 represents the up-stream tube of a pitometer, which is designed to receive the pressure of the flowing stream and communicate the same to a diaphragm 2 mounted in a water tight casing 3, which is connected with the down-stream pipe 4 of the pitometer, in a well known manner. It is well understood by those skilled in the art that pressure is exerted on the up-stream tube of a pitometer and suction exerted on the down-stream tube, so that the velocity of the flowing stream will expand and contract the diaphragm 2 as said velocity varies.

It is the principal purpose, therefore, of this invention to provide mechanism which will permit a visible inspection of the velocity of the flowing stream and will also keep a permanent photographic record of fluctuations in the velocity. To accomplish the above object, I have provided the free end of the diaphragm with a plurality of pins or posts 5 and 6, the pin 5 working in a glass tube 7 provided on the end of the casing 3 and inclosed by a metal tube 8 having a slot 9 to permit free inspection of the position of the post or pointer 5 in the glass tube. A scale $9^a$ is provided on the metal tube adjacent the slot 9 to permit the operator to determine at a glance the velocity of the stream. The pin 6 works in a similar glass tube 10, which is inclosed by a metallic casing 11, provided with oppositely disposed longitudinal slots 12 to permit the rays from a light 13 to pass through the slots 12 and the glass tube 10 and record the position of the post 6 upon a record sheet 14, carried by a drum 15, which may be rotated by suitable clock work mechanism 16 in the known manner.

Inclosing the photographic recording mechanism is a casing 17 having a partition plate 20 dividing the casing 17 into two compartments which are in communication only through a slot 21, which permits the light rays passing through the slots 12 and tube 10, to reach the sensitized record sheet and thereby record photographically the movements of the post 6, on said sheet. I have also provided the casing 16 with a hinged door 22 which will allow the operator to change the record sheet and wind the clock work mechanism, when desired.

The device illustrated in Fig. 4 is the same as that just described, with the exception of mechanism for multiplying the movements of the diaphragm and providing U-tubes for the posts to slide in. In this construction the free end of the diaphragm is provided with a bar 30 having teeth 31, which mesh with and drive a small gear 32 fixed to a shaft 33. A larger gear 34 is also fixed to the shaft 33 and rotates a similar gear 35 and moves a rack bar 36 carrying the photographing post 6ª. The gear 35 rotates a similar gear 37, which moves a rack bar 38 carrying the sight reading or visible post 5ª. With this construction, movements of the diaphragm will be doubled in the posts.

One end of the diaphragm casing 3 is provided with four threaded nipples 39 to which are wired rubber couplings 40, carrying glass U-tubes 41 and 42 and the posts 5ª and 6ª slide in these tubes. By employing U-tubes, both ends of which are connected to the casing, the glass will be kept clean by the water in the casing, flowing through the same. Also these tubes may be easily taken off and cleaned, if necessary, which would be more difficult with a straight tube.

What I claim and desire to secure by Letters Patent is:—

1. The combination of a pressure responsive mechanism having movement upon changes or variation in the pressure, a plurality of posts movable thereby and means for permanently recording the movements of one of said posts.

2. The combination of a pressure responsive mechanism, having movement upon changes or variation in the pressure, a plurality of posts movable thereby, and means for photographically recording the movements of one of said posts.

3. The combination with pressure responsive mechanism, having movement upon changes or variations in the pressure, of a post operated thereby, a slotted tube in which said post operates, and means for photographing the movements of said post through the slots in the tube.

4. A recording device comprising a casing, a sensitized record sheet mounted in said casing, an opaque tube mounted in said casing and provided with oppositely disposed slots, a post mounted in said tube and operated by variations in the force measured, and a source of light designed to direct its rays through said slots and record the variations in the movement of said post upon said sensitized record sheet.

5. A recording device comprising a casing provided with a partition plate having a slot therein, a drum mounted in said casing on one side of said partition plate and provided with a sensitized record sheet adapted to receive light through said slot, an opaque tube located in said casing on the opposite side of said partition plate and provided with oppositely disposed slots alining with the slot of the partition plate, a post movable in said tube, and operable by variations in the force to be measured, and a source of light, the rays of which are adapted to pass through said slots and record the movement of the post on said sensitized record sheet.

6. The combination with pressure responsive mechanism having movement upon changes or variations in the pressure, of a sliding post movable thereby, a member having a slot adjacent to which the post is movable, and means for photographing the movements of said post through said slot.

7. A recording device comprising an element responsive to variations in the force being measured, a rack bar carried by said element, a small gear operated by said rack bar, a larger gear operated by the small gear, a second rack bar meshing with the teeth of the large gear, a post carried by the second rack bar and means for photographically recording the movements of said post.

8. The combination with pressure responsive mechanism, having movement upon changes or variations in the pressure, of a sliding post movable thereby, means interposed between said mechanism and post for multiplying the movements of the post relatively to said mechanism, and means for photographically recording the movements of said post.

In testimony whereof I affix my signature.

JOHN A. COLE.